United States Patent Office

2,871,198
Patented Jan. 27, 1959

2,871,198

BORON HALIDE-ALKALI METAL ACID PYROPHOSPHATE COMPLEX AND CATALYST CONTAINING SAME

Herbert R. Appell, North Riverside, Ill., assignor to Universal Oil Products Company, Chicago, Ill., a corporation of Delaware No Drawing. Application October 30, 1956
Serial No. 619,129

15 Claims. (Cl. 252—433)

This application is a continuation-in-part of my copending application Serial No. 466,216 filed November 1, 1954, now abandoned.

This invention relates to novel compositions of matter and more particularly to novel complexes of boron halide and certain alkali metal acid pyrophosphates.

The novel complexes of the present invention are of special utility as catalysts or as components of catalyst compositions for effecting the conversion of organic compounds and particularly hydrocarbons. As will be illustrated in the examples appended to the present specification, the complex provides catalyst composition of exceptional ability. In these reactions the complex alone functions as catalyst. However, for some other reactions, the complex does not function as a catalyst but only as a component of catalyst compositions, and in such cases, the complex will be used along with hydrogen halide.

In one embodiment, the present invention relates to a novel composition of matter comprising a complex of boron halide and an alkali metal acid pyrophosphate.

In another embodiment, the present invention relates to a composition of matter comprising a complex of boron trifluoride and dipotassium dihydrogen pyrophosphate.

In a specific embodiment, the present invention relates to a composition of matter comprising $K_2H_2P_2O_7 \cdot BF_3$.

In another specific embodiment, the present invention relates to a composition of matter comprising $K_2H_2P_2O_7 \cdot 3BF_3$.

It will be noted that the novel composition of matter of the present invention comprises a complex of boron halide and certain alkali metal acid pyrophosphates. Of the boron halides, boron trifluoride is particularly preferred, especially when utilized in conjunction with dipotassium dihydrogen pyrophosphate. Other boron halides include boron trichloride, boron triiodide, and boron tribromide.

The alkali metal acid pyrophosphate for use in accordance with the present invention is selected from the elements in group I(A) of the periodic table. Preferred alkali metal acid pyrophosphates include lithium trihydrogen pyrophosphate, dilithium dihydrogen pyrophosphate, trilithium hydrogen pyrophosphate, sodium trihydrogen pyrophosphate, disodium dihydrogen pyrophosphate, trisodium hydrogen pyrophosphate, potassium trihydrogen pyrophosphate, dipotassium dihydrogen pyrophosphate, and tripotassium hydrogen pyrophosphate.

The complex is believed to be of the formula $Me_mH_nP_2O_7 \cdot (BF_3)_x$ in which Me is an alkali metal, $m$ and $n$ are integers selected from the numbers 1, 2, and 3 such that $m+n=4$, and wherein $x$ is an integer selected from the numbers 1, 2, and 3. Because of the theoretical formula hereinbefore set forth, and because of the method in which the complex is prepared, as well as the stability of boron trifluoride, it is believed that the boron trifluoride constituent is present as such in the complex and does not become disassociated.

The complexes of the present invention generally are non-fuming solid materials and are stable at ordinary temperature and pressure. However, when it is desired to heat the complex or to conduct reactions at elevated temperature, the heating and reaction should be effected under sufficient pressure to preclude loss of boron trihalide.

The complex may be formed in any suitable manner. In the most appropriate manner, the desired alkali metal acid pyrophosphate is placed in a suitable reaction vessel built to withstand pressure, and the desired amount of boron halide, preferably boron trifluoride, is added. In the case of boron trifluoride, this results in pressures up to 1000 pounds per square inch or more and the boron trifluoride and alkali metal acid pyrophosphate are then heated to a temperature to insure complex formation, say from about 50° C. to about 200° C. or more, although temperatures over 150° C. are seldom necessary. During complex formation of the boron halide, preferably boron trifluoride, with the alkali metal acid pyrophosphate, 1, 2, or 3 mols of boron trifluoride will complex with the alkali metal acid pyrophosphate, depending upon the particular conditions utilized.

The complex as formed in the above manner will preferably be utilized as a solid mass. When the complex is utilized as a solid mass, it may be disposed as a fixed bed in a reaction zone. When employed, hydrogen halide may be introduced to the reaction zone along with the reactants or in any suitable manner. In still another embodiment in which the complex is utilized as a solid mass, the complex may be prepared as a composite with a suitable supporting material. The supporting material preferably is not reactive with hydrogen halide and is porous. A particularly preferred support comprises activated charcoal. Other supporting materials may comprise certain metal fluorides including, for example, aluminum fluoride, calcium fluoride, magnesium fluoride, stronchium fluoride, barium fluorides, etc., as well as other solid metal halides or other metal compounds which will not be dissolved, removed, or otherwise adversely effected during use as a catalyst in effecting the conversion reaction. The composite of complex and support may be prepared in any suitable manner, for example, by impregnating the support with an aqueous solution of the desired alkali metal acid pyrophosphate, followed by drying and reaction thereof with boron trifluoride.

Novel compositions of matter within the scope of this invention include:

$LiH_3P_2O_7 \cdot BF_3$, $Li_2H_2P_2O_7 \cdot BF_3$, $Li_3HP_2O_7 \cdot BF_3$
$LiH_3P_2O_7 \cdot (BF_3)_2$, $Li_2H_2P_2O_7 \cdot (BF_3)_2$, $Li_3HP_2O_7 \cdot (BF_3)_2$
$LiH_3P_2O_7 \cdot (BF_3)_3$, $Li_2H_2P_2O_7 \cdot (BF_3)_3$, $Li_3HP_2O_7 \cdot (BF_3)_3$
$NaH_3P_2O_7 \cdot BF_3$, $Na_2H_2P_2O_7 \cdot BF_3$, $Na_3HP_2O_7 \cdot BF_3$
$NaH_3P_2O_7 \cdot (BF_3)_2$, $Na_2H_2P_2O_7 \cdot (BF_3)_2$
$Na_3HP_2O_7 \cdot (BF_3)_2$, $NaH_3P_2O_7(BF_3)_3$
$Na_2H_2P_2O_7 \cdot (BF_3)_3$, $Na_3HP_2O_7 \cdot (BF_3)_3$
$KH_3P_2O_7 \cdot BF_3$, $K_2H_2P_2O_7 \cdot BF_3$, $K_3HP_2O_7 \cdot BF_3$
$KH_3P_2O_7 \cdot (BF_3)_2$, $K_2H_2P_2O_7 \cdot (BF_3)_2$, $K_3HP_2O_7 \cdot (BF_3)_2$
$KH_3P_2O_7 \cdot (BF_3)_3$, $K_2H_2P_2O_7 \cdot (BF_3)_3$, $K_3HP_3O_7 \cdot (BF_3)_3$
$LiH_3P_2O_7 \cdot BCl_3$, $Li_2H_2P_2O_7 \cdot BCl_3$, $Li_3HP_2O_7 \cdot BCl_3$
$LiH_3P_2O_7 \cdot (BCl_3)_2$, $Li_2H_2P_2O_7 \cdot (BCl_3)_2$
$Li_3HP_2O_7 \cdot (BCl_3)_2$, $LiH_3P_2O_7 \cdot (BCl_3)_3$
$Li_2H_2P_2O_7 \cdot (BCl_3)_3$, $Li_3HP_2O_7 \cdot (BCl_3)_3$, $NaH_3P_2O_7 \cdot BCl_3$
$Na_2H_2P_2O_7 \cdot BCl_3$, $Na_3HP_2O_7 \cdot BCl_3$, $NaH_3P_2O_7 \cdot (BCl_3)_2$
$Na_2H_2P_2O_7 \cdot (BCl_3)_2$, $Na_3HP_2O_7 \cdot (BCl_3)_2$
$NaH_3P_2O_7 \cdot (BCl_3)_3$, $Na_2H_2P_2O_7 \cdot (BCl_3)_3$
$Na_3HP_2O_7 \cdot (BCl_3)_3$, $KH_3P_2O_7 \cdot BCl_3$, $K_2H_2P_2O_7 \cdot BCl_3$
$K_3HP_2O_7 \cdot BCl_3$, $KH_3P_2O_7 \cdot (BCl_3)_2$, $K_2H_2P_2O_7 \cdot (BCl_3)_2$
$K_3HP_2O_7 \cdot (BCl_3)_2$, $KH_3P_2O_7 \cdot (BCl_3)_3$, $K_2H_2P_2O_7 \cdot (BCl_3)_3$
$K_3HP_2O_7 \cdot (BCl_3)_3$.

As hereinbefore set forth, for effecting some reactions the complex is utilized in conjunction with a hydrogen halide, for example, hydrogen fluoride, hydrogen chloride, hydrogen bromide, etc. It is understood that, in some cases, certain halogen-containing compounds and particularly alkyl halides, including alkyl fluoride, alkyl chloride, alkyl bromide, and alkyl iodide may be utilized in place of or along with the hydrogen halide. Specific alkyl halides include ethyl fluoride, propyl fluoride, butyl fluoride, amyl fluoride, hexyl fluoride, etc., ethyl chloride, propyl chloride, butyl chloride, amyl chloride, hexyl chloride, etc., ethyl bromide, propyl bromide, butyl bromide, amyl bromide, hexyl bromide, etc., ethyl iodide, propyl iodide, butyl iodide, amyl iodide, hexyl iodide, etc. or mixtures thereof. It is understood that polyhaloalkane compounds, halocyclic compounds and/or polyhalocyclic compounds may be utilized in some cases. Furthermore, it is understood that these various modifications are not necessarily equivalent and that suitable modification in operation may be necessary to accommodate these changes.

When utilized along with hydrogen halide, the proportion of hydrogen halide and complex may vary over a cited range as, for example, from 0.01 to 1 or less to 200 to 1 or more, and preferably from 0.5 to 1 to 20 to 1 molar proportion of hydrogen halide per molar proportion of complex. The specific proportion generally will depend upon the particular reaction being utilized.

The catalyst composition of the present invention may be utilized for effecting various reactions of organic compounds and particularly of hydrocarbons. These reactions include (A) condensation reactions, in which two molecules which may be the same or different, are condensed to form a larger size molecule, (B) destructive reactions in which a molecule is decomposed into a smaller size molecule or into two or more molecules, (C) rearrangement reactions as, for example, isomerization, (D) disproportionation reactions in which a radical is transferred from one molecule to another molecule, (E) hydrogenation reactions, and (F) other reactions. Among these reactions are (1) polymerization of olefins and particularly of ethylene, propylene, 1-butene, 2-butene, isobutylene, amylenes, and higher boiling olefins, or mixtures thereof, (2) alkylation of isoparaffins with olefins, or other alkylating agents, for example, alkyl halides, and particularly the alkylation of isobutane, isopentane, and/or isohexane with ethylene, proylene, 1-butene, 2-butene, isobutylene, amylenes, etc., or mixtures thereof, (3) alkylation of aromatic compounds, particularly hydrocarbons, with olefins and other alkylating agents, and particularly the alkylation of benzene, toluene, etc., with propylene, butylene, amylene, and higher boiling olefins such as nonenes, decenes, undecenes, dodecenes, tridecenes, etc., or mixtures thereof, (4) isomerization of paraffins and particularly of n-butane, n-pentane, n-heptane, n-octane, etc., or mixtures thereof, including the isomerization of less highly branched chain paraffins to more highly branched chain paraffins as the isomerization of 2- or 3-methyl-pentane to 2,2-dimethylbutane, (5) isomerization of naphthenes, for example, the isomerization of methylcyclopentane to cyclohexane, isomerization of dimethylcyclopentane to methylcyclohexane, etc., (6) alkylation of phenols or thiophenols with olefins or other alkylating agents, (7) alkylation of thiophenes with olefins or other alkylating agents, (8) hydrogen transfer reactions, (9) alkyl transfer reactions, (10) dealkylation reactions, (11) cracking of oil heavier than gasoline into lower boiling products and particularly gasoline, and (12) other reactions of hydrocarbons and other organic compounds. The operating conditions to be employed will depend upon the particular reaction and generally will be at ambient temperature, although elevated temperatures may be employed, particularly with superatmospheric pressure. In some reactions it may be preferred to utilize very low temperatures. Thus, the temperature may range from −50° C. or less to 300° C. or more, preferably from 10° C. to 150° C., and the pressure may range from atmospheric to 5000 pounds per square inch or more, preferably from atmospheric to 1000 pounds per square inch. Hydrogen may be employed when required or of advantage. The process may be effected in any suitable manner, which will depend upon the particular reaction and the form in which the catalyst is used. When the catalyst is used as a solid mass, it may be disposed as a fixed bed in a reaction zone, and the reactants and hydrogen halide, when employed, are supplied thereto in any suitable manner. The reactants may be passed either in upward or downward flow through the catalyst bed. In one embodiment, hydrogen halide, when employed, may be co-mingled with all or a portion of one of the reactants and the mixture supplied to the reaction zone. In this embodiment, a convenient method is to pass all or a portion of the reactant or, in case two reactants are employed, to pass all or a portion of one of the reactants, usually the less reactive material, continuously or intermittently through a body or pool of liquid hydrogen halide, and the reactant saturated with hydrogen halide then is introduced into the reaction zone. When desired, the hydrogen halide may be supplied separately to the reaction zone or, when desired, the hydrogen halide may be introduced at either the upper or lower portion of the reaction zone, and the reactants introduced at a mid-point of the reaction zone.

The hydrogen halide, when employed, may be introduced continuously or intermittently as desired. In some cases, the hydrogen halide may be introduced initially in the operation and the flow hydrogen halide discontinued during part or all of the remainder of the operation. Apparently, sufficient hydrogen halide is retained in the reaction zone, possibly in a chemical or physical association with the complex, to produce the desired effect. Also, in some cases, the boron halide may be introduced into the reaction zone during the conversion process, either continuously or intermittently, especially in operations where boron halide may be evolved or removed with the effluent product from the reaction zone.

Regardless of the particular operation employed, the products are fractionated or otherwise separated to recover the desired product and to separate unconverted material for recycling. Hydrogen halide, when present in the effluent product, likewise is separated and preferably is recycled. Similarly, when boron halide is present in the effluent product, it may be separated and either recycled to the reaction zone or reused in preparing additional complex.

The following examples are introduced to illustrate further the novelty and utility of the present invention but with no intention of unduly limiting the same.

*Example I*

A composition of matter was prepared in the following manner. 138 grams of potassium dihydrogen phosphate ($KH_2PO_4$) was heated at 500° C. for one hour; 119.3 grams of dry material was recovered. This dry material was placed in a rotating autoclave, the autoclave was sealed, and boron trifluoride was added to a pressure of 50 atm. Heating was begun and the autoclave temperature was raised to 100° C. and maintained at this temperature for 6 hours. After cooling, 146.7 grams of dipotassium dihydrogen pyrophosphate complexed with boron trifluoride, $K_2H_2P_2O_7 \cdot BF_3$, was recovered. This substance was designated as catalyst A for testing.

*Example II*

Another novel composition of matter was prepared in the following manner. Fifty grams of activated wood charcoal was impregnated with a saturated boiling aqueous solution of potassium dihydrogen phosphate ($KH_2PO_4$). The excess liquid was drained off and the composite heated to 120° C. for one hour and then heated to 400° C. for two hours in a stream of nitrogen. From this treatment was recovered 79.5 grams of dried composite. This dried composite was placed in an autoclave, the autoclave was sealed, and boron trifluoride added to a pressure of 30 atm. The autoclave was then heated to a temperature of 100° C. and maintained at these conditions for 5 hours. After cooling, the pressure on the autoclave was released and 103.7 grams of charcoal supported complex recovered therefrom. The composition analyzed as 52% $K_2H_2P_2O_7 \cdot 3BF_3$ on charcoal. This composition was designated as catalyst B.

*Example III*

Each of the above-prepared compositions of matter was tested for its power to catalyze the alkylation of an isoparaffin, namely, isobutane with an olefin, namely, propylene. In these experiments the catalyst was placed as a fixed bed in a reaction zone and tested at a temperature of 150° C., a pressure of 1000 p. s. i., and an hourly liquid space velocity of about 1.4. The charge stock utilized had the following analysis by volume: 0.5% ethylene, 0.2% ethane, 16.9% propylene, 0.8% propane, 80.5% isobutane, and 1.1% of a mixture of 1-butene and 2-butene. The results indicated that each of these compositions, namely, catalyst A and catalyst B were useful to promote the alkylation of isoparaffins with olefins reaction. The charcoal supported composition, catalyst B, was the most active catalyst.

I claim as my invention:

1. A complex of a boron halide and an alkali metal acid pyrophosphate.
2. A complex of boron trifluoride and an alkali metal acid pyrophosphate.
3. A complex of boron trifluoride and a di-alkali metal dihydrogen pyrophosphate.
4. A complex of boron trifluoride and dilithium dihydrogen pyrophosphate.
5. A complex of boron trifluoride and disodium dihydrogen pyrophosphate.
6. A complex of boron trifluoride and dipotassium dihydrogen pyrophosphate.
7. A compound of the formula $K_2H_2P_2O_7 \cdot BF_3$.
8. A compound of the formula $K_2H_2P_2O_7 \cdot 3BF_3$.
9. A solid composite of a complex of boron halide and an alkali metal acid pyrophosphate with a solid support.
10. A solid composite of a complex of boron trifluoride and an alkali metal acid pyrophosphate with activated charcoal.
11. A solid composite of a complex of boron trifluoride and a di-alkali metal dihydrogen pyrophosphate with activated charcoal.
12. A solid composite of a complex of boron trifluoride and dilithium dihydrogen pyrophosphate with activated charcoal.
13. A solid composite of a complex of boron trifluoride and disodium dihydrogen pyrophosphate with activated charcoal.
14. A solid composite of a complex of boron trifluoride and dipotassium dihydrogen pyrophosphate with activated charcoal.
15. A solid composite of $K_2H_2P_2O_7 \cdot 3BF_3$ with activated charcoal.

References Cited in the file of this patent

UNITED STATES PATENTS

| Number | Name | Date |
|---|---|---|
| 1,895,620 | Gale et al. | Jan. 31, 1933 |
| 2,060,871 | Ipatieff | Nov. 17, 1936 |
| 2,097,482 | Weber et al. | Nov. 2, 1937 |
| 2,544,818 | Axe | Mar. 13, 1951 |
| 2,614,101 | Uraneck et al. | Oct. 14, 1952 |
| 2,748,090 | Watkins | May 29, 1956 |